UNITED STATES PATENT OFFICE 2,303,177

POLYVALENT LACTAMS

Paul Schlack, Berlin-Treptow, Germany; vested in the Alien Property Custodian

No Drawing. Application December 8, 1939, Serial No. 308,176. In Germany December 6, 1938

8 Claims. (Cl. 260—239)

The present invention relates to production of reactive polyvalent lactams.

I have found that polyvalent N-acyl-polylactams valuable for the production of polyamides may be obtained by treating lactams having a hydrogen atom at the lactam nitrogen with polyvalent acylating agents. This conversion surprisingly is carried out smoothly even if unstable lactams having a number of ring members of more than 6 are employed and the reaction products show high reactivity against substances capable of being acylated, especially hydroxy compounds and amino compounds. By the action of polyvalent acyl lactams on polyvalent substances capable of being acylated very valuable polymers are obtained which, depending upon the number of the reactive groups in the monomers, are 2- or 3-dimensional. The polyvalent N-acyl-polylactams may be prepared by reacting lactams with acid derivatives, for instance carboxylic acid chlorides, sulfonic acid chlorides, carbamide acid chlorides, polyisocyanates, and polyvalent acid anhydrides. In some cases they may be obtained by means of the esters or amides or even by means of the free acids themselves, especially if the reaction is carried out in the presence of agents which facilitate the reaction, for instance solvents like phenol and small amounts of acid or alkaline condensing agents. In the case of acid halides, the presence of acid binding agents, for instance the addition of tertiary amines like pyridine or potassium carbonate may be of advantage or the acid halides may act on metal compounds of the lactams, for instance sodium compounds. Pyridine bases are less suited as acid binding agents in the case when the reaction is carried out with sulfonic acid chlorides. In these cases mostly ortho-esters are obtained which cannot always be rearranged into the corresponding N-acyl compounds. Rearrangements of this kind may be favored by the presence of small amounts of alkaline metal compounds, for instance magnesium oxide and organic magnesium compounds, for instance magnesium ethyl malone ester.

In most cases working in indifferent solvents is the most advantageous. Usually simple heating of the lactams with the calculated amounts of the polyvalent acid halide used in an indifferent solvent like carbon tetrachloride, benzene, or toluene until the hydrogen halide development ceases, suffices. If esters are employed for acylation it is advisable to add a slight amount of an alkaline catalyst, for instance alkali metal, basic reacting alkali- or alkaline earth compounds such as sodium compounds of the lactams, sodium methylmalonester, magnesium methylmalonester, magnesium oleate, magnesium butyrate.

5-, 6-, 7- and more membered lactams are useful in the presence of this invention, for instance butyrolactam, piperidone, ε-caprolactam and alkylated derivatives of caprolactam as well as the lactam of ζ-aminoheptanoic acid. Instead of lactams of simple ω-aminocarboxylic acids and their substitution products substances may be employed in which the ring is interrupted by a hetero atom for instance oxygen or sulfur, as is the case with the lactam of β-aminoethylthioacetic acid, which may be easily obtained from thioglycolic acid and chlorcethylamine.

The lactams may for instance be acylated by the following acid compounds: phosgene, oxalylchloride, adipic acid chloride, sebacic acid chloride, butane-1.2.3.4-tetracarboxylic acid dianhydride, piperazinediformylchloride (obtained from piperazine and phosgene), thiodiglycolic acid chloride, terephthalic acid chloride, 1.3.5-benezenetricarboxylic acid chloride, adipinyldicyanamide (obtainable by the action of adipic acid ester on sodium cyanamide in alcohol), cyanurchloride (acting on the sodium compound of lactams), propanedisulfurchloride (obtained from propane, sulfurdioxide and chlorine in the presence of light or short wave lengths), 1.4-butanedisulfochloride, diethylether-ββ'-disulfochloride, piperazino-bis-sulfuric acid chloride (obtained from piperazinehydrochloride and sulfurylchloride), sebacic acid diphenylester, oxalic acid diphenylester.

The following examples illustrate the invention:

Example 1

2 mols of ε-caprolactam are heated in 3 parts of benzene together with 1 mol adipic acid chloride until the hydrogen chloride development has ceased. The benzene is then distilled off. The reaction product remains as an oil which on boiling solidifies to almost colorless crystals having a melting point of 64° C. If this product is heated with the equivalent amount of hexamethylenediamine in a closed vessel for 4 hours to 230 to 250° C. a fusible polymer is obtained which can be spun into fibers from the melt.

Example 2

2 mols of ε-caprolactam and 3 mols of sebacic acid cholride are heated in benzene, as in Example 1. After distilling off the greater part of the benzene the reaction product partly crystallizes on cooling in colorless crystals. The remainder is recovered by concentrating the mother-lye. Melting point 61° C. The product shows a very similar behaviour as that of Example 1.

*Example 3*

Piperidone is heated with adipic acid diamide until the development of ammonia ceases. The reaction product reacts with diamines when heated and forms a condensation polymer.

*Example 4*

2 mols of "Suberonisoxime" are heated with 1 mol pimelic acid chloride in benzene until the hydrogen chloride development ceases. The reaction product can be condensed after distilling off the benzene with hexamethylenediamine to yield a condensation superpolymer.

*Example 5*

1 part of caprolactam is heated with 1 part of an interpolymer of maleic acid anhydride and vinylethylether in cyclohexanone for 2 hours at 150° C. The nitrogen-containing reaction product reacts with diamines and forms an insoluble resin.

*Example 6*

Piperidone is heated in toluene with 1.4-butanedisulfochloride obtained by chlorinating the isothiourea from 1.4-butylenechloride and thiourea until the hydrogen chloride development ceases. The dilactam remaining after the benzene is distilled off reacts with diamines, monoalcohols and glycols, as described in the preceding examples.

*Example 7*

3 mols of the isoxime of methylcyclohexanone are heated with 1 mol of 1.3.5-benzenetricarboxylic acid chloride until no more hydrogen chloride is set free. After concentrating and cooling the trilactam crystallizes. It reacts with polyvalent amines and forms insoluble resins.

*Example 8*

1 mol of ε-caprolactam is heated in a vacuum of 2 mm. in the presence of ½₀ mol magnesium butylate with ½ mol sebacic diphenylester until the liberated phenol is distilled off. The residue after recrystallization from benzene proves to be identical with the product of Example 2.

*Example 9*

To a solution of 1 mol ε-caprolactam there is added a little less than the calculated amount of sodium powder in toluene and the mixture boiled until the formation of hydrogen ceases. The sodium compound of the lactam which is insoluble in benzene is formed without any discoloration. The same compound is obtained by boiling of the benzene solution with a slurry of finely ground sodium amide in benzene. After the sodium compound has been powderized the calculated amount of adipic acid chloride is added while cooling, the mixture left standing in the cold for 2 hours and finally heated another hour to 40° C. After the reaction mass has been decomposed with water and the aqueous layer decanted the benzene solution is worked up as in Example 1. The adipinyl-bis-ε-caprolactam is obtained in good yield.

I claim:

1. A proces of preparing poly lactams which comprises reacting monomeric lactams containing the group

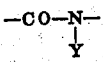

wherein Y is selected from the class consisting of hydrogen and an alkali metal with polybasic acylating agents.

2. A process of preparing poly lactams which comprises reacting a monomeric lactam containing the group

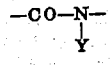

wherein Y is selected from the class consisting of hydrogen and an alkali metal with a poly acid halide.

3. A process of preparing poly lactams which comprises reacting a monomeric lactam containing the group

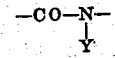

wherein Y is selected from the class consisting of hydrogen and an alkali metal with an aryl poly acid ester.

4. A process of preparing poly lactams which comprises reacting a monomeric lactam containing the group

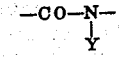

wherein Y is selected from the class consisting of hydrogen and an alkali metal with a free polycarboxylic acid in the presence of a condensing agent.

5. The process of preparing poly lactams which comprises reacting an alkali metal compound of a lactam in which the alkali metal is linked to nitrogen with a poly acid halide.

6. The process as defined in claim 1 in which the monovalent lactam has a ring of at least 6 members.

7. The process as defined in claim 2 in which the monovalent lactam has a ring of at least 6 members.

8. Polylactams in which at least 2 lactam radicles are linked through their nitrogen atoms by an acyl radicle of a polybasic organic acid.

PAUL SCHLACK.